Sept. 25, 1928.

H. H. LINN 1,685,641

VEHICLE DRIVE

Filed April 2, 1928　　3 Sheets-Sheet 1

Inventor
H. H. LINN.
By
Attorney

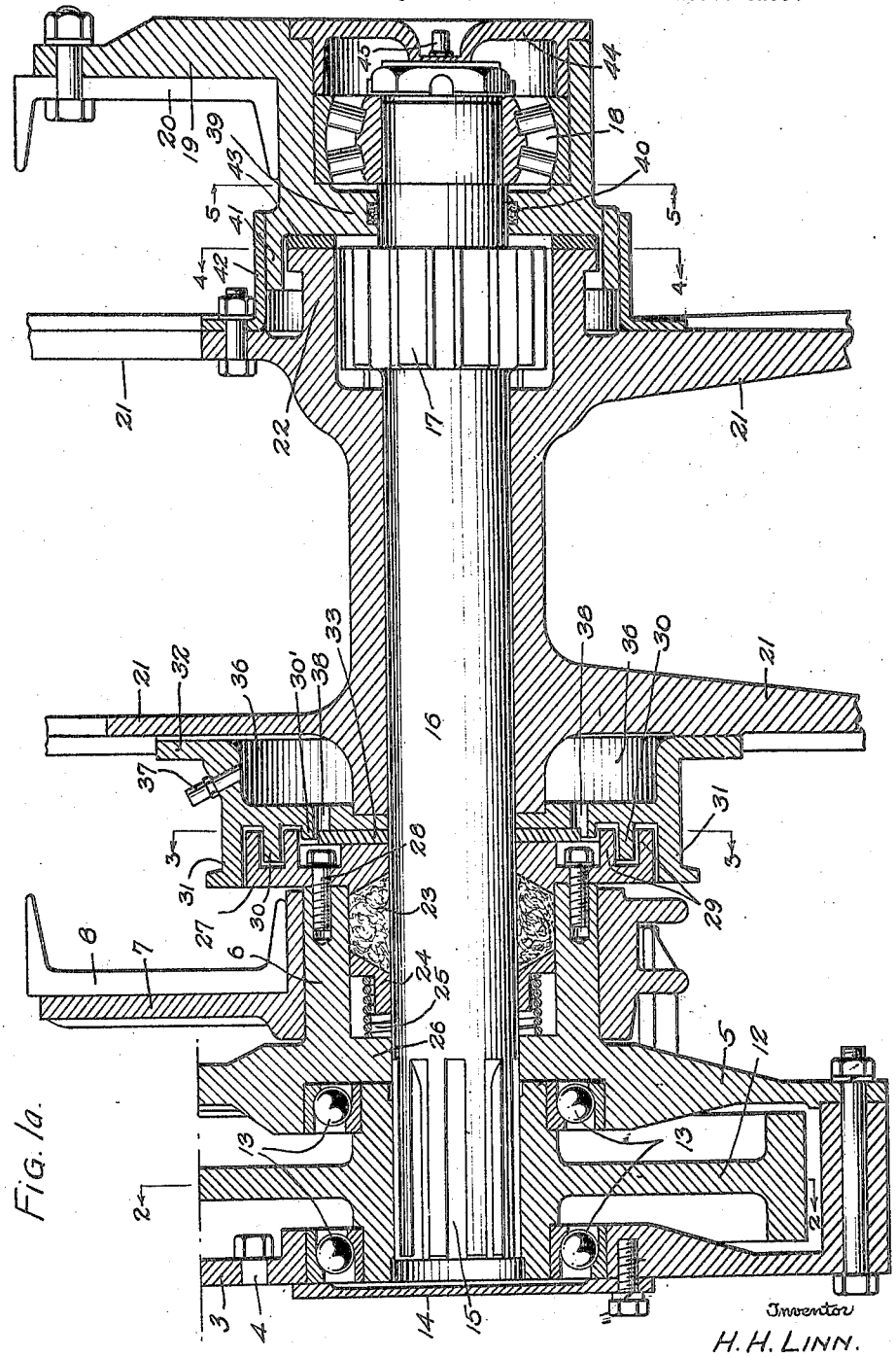

Sept. 25, 1928.  
H. H. LINN  
VEHICLE DRIVE  
Filed April 2, 1928   3 Sheets-Sheet 3

INVENTOR.  
H. H. LINN.  
BY  
ATTORNEY.

Patented Sept. 25, 1928.

1,685,641

UNITED STATES PATENT OFFICE.

HOLMAN HARRY LINN, OF MORRIS, NEW YORK, ASSIGNOR TO THE LINN MANUFACTURING CORPORATION, OF MORRIS, NEW YORK, A CORPORATION OF NEW YORK.

VEHICLE DRIVE.

Application filed April 2, 1928. Serial No. 266,822.

This invention relates to vehicle drives and provides a double reduction unit designed primarily for use with tractors and other vehicles subject to hard usage and heavy duty service.

In a reduction gear of this character it is essential that the parts be constructed to withstand extremely hard usage, maintain effective alignment and proper driving relation and yet be readily accessible for repair or replacement purposes. Furthermore, it is expedient or desirable to maintain efficient lubrication of the parts at all times and to exclude water, mud and other foreign substances.

Therefore, one of the principal objects of the present invention is the provision of a reduction gear having a three-point suspension and otherwise constructed and arranged with a view to maximum strength and resistance to distortion and in which provision is made for ample and effective lubrication while at the same time preventing the admission of water, mud, etc.

Other objects as well as the nature, characteristic features and scope of the invention will more readily be understood from the following description taken in connection with the accompanying drawings, wherein Figure 1 is a horizontal sectional view of the double reduction unit, one side only of the vehicle being shown.

Fig. 1ª is a continuation laterally of the structure Fig. 1.

Figure 1:
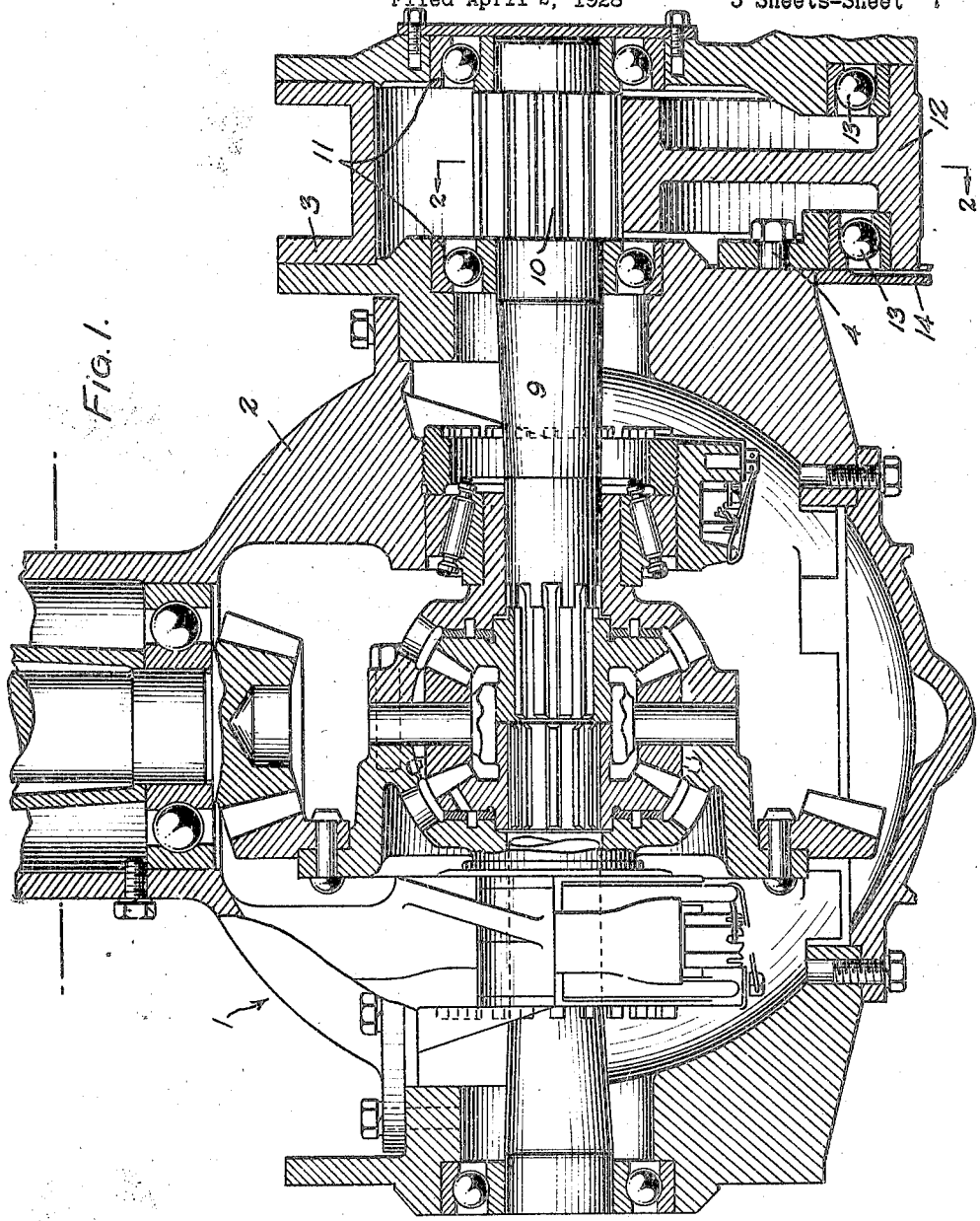
Figure 2:
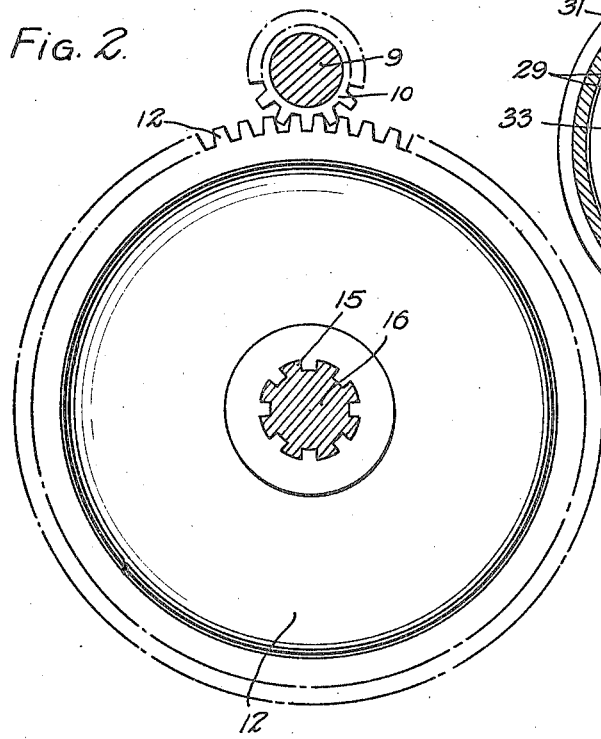
Fig. 2 is a sectional view on line 2—2 of Fig. 1ª.
Figure 3:
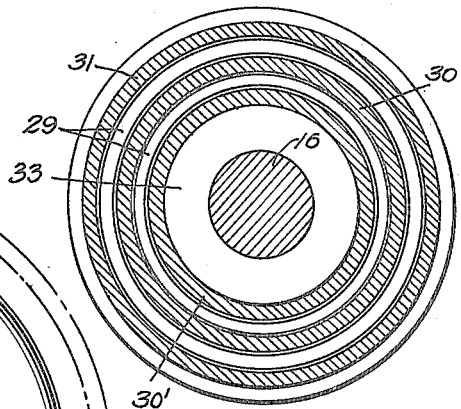
Fig. 3 is a sectional view on line 3—3 of Fig. 1ª.
Figure 4:
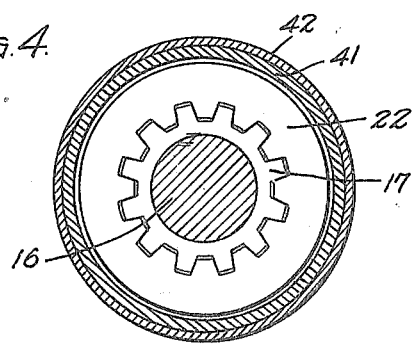
Fig. 4 is a sectional view on line 4—4 of Fig. 1ª.
Figure 5:
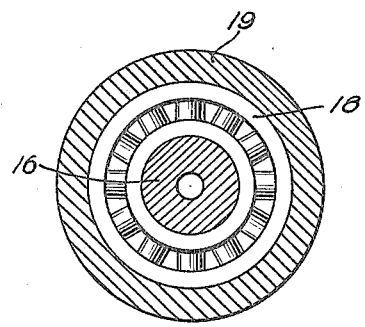
Fig. 5 is a sectional view on line 5—5 of Fig. 1ª.

The double reduction unit is arranged between the differential and driving sprocket, being of course duplicated on each side of the differential. In the detail illustrated, there is provided a differential 1 of conventional design but of very heavy and rugged construction. It is enclosed in a housing 2. A gear casing 3 is secured, as by bolts 4, to the differential housing and extends rearwardly thereof. The gear casing is equipped with a removable cover plate 5 formed with a laterally projecting trunnion 6 fitting into a hanger 7 on a frame member 8. The front of the differential is carried in a cross member of the vehicle frame and this arrangement together with the hanger supported trunnion establishes a three-point suspension for the unit.

A universal shaft 9 extends through the differential housing 2 and into the gear casing 3, where it is provided with a pinion 10, the shaft being supported on each side of the pinion by bearings 11 in the differential housing and cover plate 5.

Meshing with the pinion 10 is a gear wheel 12, the hub of which is supported at its respective ends in bearings 13 mounted in the gear casing and cover plate. The bearing 13 in the gear casing has a retainer plate 14 detachably secured to the gear casing, said retainer plate closing an opening in the gear casing through which the bearing is accessible.

The hub of the gear wheel 12 is broached to receive the splined end 15 of a driving axle 16, which extends through the trunnion 6 of the cover plate in spaced relation to the inner wall thereof. The other end of the driving axle is provided with raised splines or teeth 17 beyond which it is mounted in a self-aligning bearing 18 carried in a hanger 19 bolted to a frame element 20. A double sprocket wheel 21 is loosely mounted on the driving axle between the gear casing and the spline surface 17. The hub of the sprocket wheel has an elongated bearing on the driving axle and is formed with an endwise portion 22 of proper diameter and otherwise constructed to cooperate with spline connection 17 so as to drive the sprocket wheel in the operation of the axle.

In reduction gearing of this type it is important that means be provided to prevent or minimize excessive lubrication losses while at the same time guarding against the entrance of water, mud and other foreign substances. To secure this result, while at the same time insuring the effective lubrication of the parts, the space between the trunnion 6 and the drive axle 16 is provided with a felt packing ring 23. On that side of the ring next the gear casing is arranged a packing gland 24 freely slidable on the axle and urged towards the packing ring by a coil spring 25 secured between the gland and a flange 26 extending inwardly from the trunnion. Manifestly, the felt ring is held in a state of compression by the pressure of the spring and, therefore, does not rotate with the axle so that on contact with mud, grit or other abrasive it would be short-lived. To prevent this hazard, I provide mated inner and outer protector plates 27 and 31, whereof the inner or pressure plate 27 is bolted, as at 28, to the trunnion, and whereof the outer or guard plate 31 is secured to the sprocket wheel 21.

The plate 27 is formed with laterally projecting concentric ribs 29—of which one is a rim flange—which mate with the overlying rim 31 and lip extensions 30 and 30', respectively, of the guard plate. The outer end of the guard plate overlies the hub of the sprocket wheel 21 and has an outstanding circumferential flange 32 whereby it is secured to the sprocket wheel.

Mounted on the axle and between the hub elements 34 and 35 of said plates is a bronze thrust washer 33.

The chamber 36 formed intermediate the sprocket wheel 21 and a guard plate 31 serves as a lubricant reservoir to which lubricant may be introduced through a fitting 37, the chamber being ported, as at 38, for the admission of lubricant to the thrust washer.

It will be apparent that any excess of oil or lubricant must pass through the tortuous passage established by the mated lip extensions, and since the rim element 31 revolves with the sprocket wheel 21, centrifugal force is developed at the points mentioned which must be overcome before any extraneous matter can enter between the interfitted plates. This force tends in a measure to the accumulation of oil in the tortuous channel or well between the plates, which oil, if moving at all, is moving in opposition to foreign matter seeking to enter. Evidently, the entrance of foreign matter at this point is resisted, first, by centrifugal force; second by the tendency of the excess oil to be forced in a direction opposing that of foreign matter; and, third, by the presence of such excess oil in the tortuous passage serving as a seal.

It is of course important that the self-aligning bearing 18 at the outer end of the driving axle 16 also be partly lubricated and protected from dirt. To secure this result, the hanger 19 is formed with an inwardly projecting flange 39, between the pinion 17 and the bearing 18, the inner edge of which is recessed to receive a packing ring 40. The hanger 19 is also formed with a lip 41 which partially overlies the extended hub of the sprocket wheel 21 and cooperates with a guard flange 42.

A thrust washer 43 is arranged concentric with the driving axle and between the extreme end of the portion 22, of the hub of the sprocket wheel 21 and the end of the hanger 19, at a point inwardly of the lip 41. The open end of hanger 19 is adapted for closure by a cap 44 through the fitting 45 in which lubricant may be forced into the bearing 18 and beyond the packing ring 40 into the space between the lip 41 and guard flange 42, and into the chamber between the guard flange and extended hub portion 22 of the sprocket 21. The thrust washer 43 is thus effectively lubricated and the centrifugal force developed by the relative rotation of the guard flange 42 causes any excess lubricant to pass between said flange and the lip 41 of the hanger 19.

Thus, the movement of lubricant under the centrifugal action, and the liquid seal established by the very presence of lubricant are effective to exclude water or other foreign matter from the bearing 18. Moreover, the packing ring 41 serves in no small degree to prevent the passage of foreign matter to the bearing.

It will of course be understood that all joints between the various removable and separable sections of the fixed parts of the unit are to be provided with the usual gaskets to prevent leakage.

The reduction unit is of the double type in that there is initially a reduction between the tail shaft of the differential and the ring gear and a second reduction in the ratio between the pinion 10 and gear 12. The total reduction, obviously, may be varied to suit the case, but for tractor uses the ratio is about 21 to 1.

Evidently I have provided a unit of simple construction involving few parts so disposed as to provide for convenient renewal or repair when necessary. The three-point suspension operates to secure the utmost rigidity of structure in order to meet the heavy duty demands to which the tractor is usually subjected. And the unit has been constructed to afford ample lubrication losses, while at the same time reducing to a marked degree the possibility of the entrance of water, mud or grit to the bearings. Thus, wear incidental to the entry of such substances is prevented to a large degree, and the unit as a whole is afforded longer life and more uniform service than would otherwise be the case.

No reference is made herein to any particular metal employed in connection with the parts, but it is manifest that such metal selections shall be with a view to securing lightness without sacrificing strength or resistance to wear.

Having described my invention, I claim

1. In a drive for tractors and the like having in its organization a differential, a driving axle, and gear connections, a front supported housing for the differential, gear casings rigidly joined to said housing at either side thereof, and trunnions carried by the gear casings and affording together with the front supported end of the differential a three-point suspension for the unit.

2. In a drive for tractors and the like having in its organization a differential, a driving axle, and gear connections, a front supported differential housing and gear casings carried thereby, removable cover plates for the gear casings, and trunnions carried by said cover plates and constituting means of support whereby a three-point suspension is established.

3. In a reduction unit for tractor and similar drives including a differential, a driving axle operatively connected to the differential, a double sprocket mounted on and directly coupled to the axle, a self-aligning bearing at one end of the sprocket wheel, a thrust collar at the other end, and means for lubricating the collar.

4. The combination with a driving axle, a driving sprocket wheel mounted thereon and formed with a lubricant chamber, a bronze collar on the axle to resist end thrust of the sprocket wheel, and mated elements operating to supply lubricant to the collar and to exclude water, mud, etc.

5. The combination with a driving axle, a driving sprocket wheel mounted thereon and formed with a lubricant chamber, a bronze collar on the axle to resist end thrust of the sprocket wheel, mated elements operating to supply lubricant to the collar and to exclude water, mud, etc., and whereof one is fixed and whereof the other rotates with the sprocket wheel, and a gland associated with the fixed element.

6. In a reduction unit for tractor and like drives including a differential, a differential housing, a gear casing removably connected in said housing, a frame supported cover plate for the casing, a driving axle operative in the gear casing, a driving sprocket wheel, an internal drive between the axle and sprocket wheel, a self-aligning bearing for the axle, and a frame carried hanger for supporting said bearing.

7. In a reduction unit for tractor and like drives including a differential, a gear casing removably connected to the differential housing, a cover plate for the gear casing formed with a trunnion, a frame engaging hanger supporting the trunnion, a driving axle projecting from the gear casing, a gear in said casing and fixed on said axle, bearings in said casing and cover plate for supporting the gear, a pinion mounted on the differential shaft and meshing with said gear, a sprocket wheel loose on the axle beyond said trunnion, a drive intermediate the axle and sprocket wheel, and means intermediate said trunnion and sprocket wheel to prevent the entrance of deleterious matter to said bearings, said means including a member fixed to the trunnion and a cooperating member carried by and movable with the sprocket wheel, said members interfitting to form a tortuous passage to which excess lubricant may be directed by the centrifugal action of the member carried by the sprocket.

8. In a reduction unit for tractor and like drives including a differential, a gear casing removably connected to the differential housing, a cover plate for the gear casing and formed with a trunnion, a frame engaging hanger supporting the trunnion, a driving axle projecting from the gear casing, a gear in said casing and fixed on said axle, bearings in said casing and cover plate for supporting the gear, a pinion mounted on the differential shaft and meshing with said gear, a sprocket wheel loose on the axle beyond said trunnion, a drive intermediate the axle and sprocket wheel, packing interposed between the axle and trunnion, and means for supplying lubricant and for excluding dirt and comprising plates whereof one is fixed to the trunnion and the other rotates with the sprocket wheel, said plates having nested lip extensions.

9. In a reduction unit for tractor and like drives including a differential, a gear casing removably connected to the differential housing, a cover plate for the gear casing formed with a trunnion, a frame engaging hanger supporting the trunnion, a driving axle projecting from the gear casing, a gear in said casing fixed on said axle, bearings in said casing and cover plate for supporting the gear, a pinion mounted on the differential shaft and meshing with said gear, a sprocket wheel loose on the drive axle, packing interposed between the axle and trunnion, a pressure plate secured to the trunnion and concentric with the axle and formed beyond the trunnion with laterally extending spaced concentric lips, a packing gland engaging said packing in opposition to the pressure plate, means for maintaining a pressure movement of said gland on the packing, and a guard plate carried by and movable with the sprocket wheel and having a lip to extend between the spaced lips of the pressure plate.

10. In a reduction unit for tractor and like drives including a differential, a gear casing removably connected to the differential housing, a cover plate for the gear casing formed with a trunnion, a frame engaging hanger supporting the trunnion, a driving axle projecting from the gear casing, a gear in said casing fixed on said axle, bearings in said casing and cover plate for supporting the gear, a pinion mounted on the differential shaft and meshing with said gear, a sprocket wheel loose on the axle beyond said trunnion, a drive intermediate the axle and sprocket wheel, packing interposed between the axle and trunnion, a pressure plate secured to the trunnion and concentric with the axle and formed beyond the trunnion with laterally extending spaced concentric lips, a packing gland engaging said packing in opposition to the pressure plate, a spring cooperating with the gland to compress the packing, and a guard plate carried by and movable with the sprocket wheel and having a lip to extend between the spaced lips of the pressure plate, said guard plate having a skirt overlying the rim of the pressure plate.

11. In a reduction unit for tractor and like drives including a differential, a gear casing removably connected to the differential housing, a cover plate for the gear casing and formed with a trunnion, a frame engaging hanger supporting the trunnion, a driving axle projecting from the gear casing, a gear in said casing fixed on said axle, bearings in said casing and cover plate for supporting the gear, a pinion mounted on the differential shaft and meshing with said gear, a sprocket wheel loose on the axle beyond said trunnion, a drive intermediate the axle and sprocket wheel, packing interposed between the axle and trunnion, a pressure plate secured to the trunnion concentric with the axle and formed beyond the trunnion with laterally extending spaced concentric lips, a packing gland engaging said packing in opposition to the pressure plate, spring means for maintaining a pressure movement of said gland on the packing, a guard plate carried by and movable with the sprocket wheel and having a lip to extend between the spaced lips of the pressure plate, a thrust washer interposed between the pressure plate and guard plate, and means for supplying lubricant to the washer and whereby excess lubricant establishes a liquid seal.

12. A reduction unit for tractor and like drives including a differential, comprising a driving axle, gearing connecting it with the differential, a double sprocket wheel splined to the driving axle, a frame connected hanger beyond the sprocket wheel, a self-aligning bearing carried by the hanger and supporting the axle, a lip on the hanger overlying the hub of the sprocket wheel, and a guard flange carried by the sprocket wheel and overlying said lip.

13. A reduction unit for tractor and like drives including a differential, comprising a driving axle, gearing connecting it with the differential, a sprocket wheel slidable on the axle, an internal drive between the sprocket wheel and axle, a frame connected hanger beyond the sprocket wheel, a self-aligning bearing carried by the hanger and supporting the axle beyond the sprocket wheel, an inwardly extending flange on the hanger immediately concentric with the drive axle, a packing in said flange bearing on the drive axle, a thrust washer between said flange and the proximate end of the sprocket hub, a lip on the hanger overlying the thrust washer and the proximate end of the sprocket hub, and a guard flange carried by and movable with the sprocket and overlying the lip.

14. The combination of a driving axle, a driving sprocket wheel splined to the axle, a self-aligning bearing for the axle, and means for protecting it, including a hub extension of the sprocket wheel.

15. The combination of a driving axle, a driving sprocket wheel, end thrust provisions for the sprocket wheel, including labyrinth packing, a lubricant chamber in the sprocket wheel in communication with the end thrust provisions, and means for utilizing excess lubricant to seal the labyrinth packing.

16. The combination of a driving axle, a driving sprocket wheel, an end thrust device for the sprocket wheel, packing, a gland, means cooperating with it to compress the packing, means for feeding lubricant to the end thrust device, and means for trapping lubricant to establish a continuous ring seal.

In testimony whereof I affix my signature.

HOLMAN HARRY LINN.